United States Patent [19]

Stich et al.

[11] Patent Number: 5,615,129

[45] Date of Patent: Mar. 25, 1997

[54] METHOD AND APPARATUS FOR ADAPTIVE AND CORRECTIVE DETERMINATION OF BATTERY RUN-TIME IN UNINTERRUPTIBLE POWER SYSTEMS

[75] Inventors: Frederick A. Stich, Wisconsin Rapids; Thomas G. Hubert, Necedah; Timothy Walsh, Elroy, all of Wis.

[73] Assignee: General Signal Power Systems, Inc., Waukesha, Wis.

[21] Appl. No.: 390,972

[22] Filed: Feb. 21, 1995

[51] Int. Cl.$^6$ .................................................. G04F 7/00
[52] U.S. Cl. ..................... 364/492; 340/636; 364/569; 320/48; 307/66
[58] Field of Search ....................... 340/636; 364/569, 364/492; 320/48; 307/66; 324/426

[56] References Cited

U.S. PATENT DOCUMENTS

| | | | |
|---|---|---|---|
| 3,118,137 | 1/1964 | Vincent . | |
| 3,925,772 | 12/1975 | Miller et al. . | |
| 4,388,615 | 6/1983 | Ford et al. | 340/516 |
| 4,433,295 | 2/1984 | Zaugg et al. . | |
| 4,528,458 | 7/1985 | Nelson et al. | 307/64 |
| 4,703,193 | 10/1987 | Kawabata | 307/66 |
| 4,709,318 | 11/1987 | Gephart et al. | 307/66 |
| 4,718,020 | 1/1988 | Duich et al. | 364/500 |
| 4,779,050 | 10/1988 | Ohnari . | |
| 4,876,513 | 10/1989 | Brilmyer et al. . | |
| 5,027,294 | 6/1991 | Fakruddin et al. | 364/550 |
| 5,057,697 | 10/1991 | Hammond et al. | 307/66 |
| 5,117,324 | 5/1992 | Johnson, Jr. | 361/66 |
| 5,148,043 | 9/1992 | Hirata et al. | 307/66 |
| 5,182,518 | 11/1993 | Stich et al. | 324/511 |
| 5,239,286 | 8/1993 | Komatsuda | 340/636 |
| 5,250,904 | 10/1993 | Salander et al. | 324/430 |
| 5,278,509 | 1/1994 | Haynes et al. | 324/427 |
| 5,295,078 | 3/1994 | Stich et al. | 364/483 |
| 5,321,627 | 6/1994 | Reher | 364/483 |
| 5,325,041 | 6/1994 | Briggs | 320/44 |
| 5,339,017 | 8/1994 | Yang | 320/13 |
| 5,341,084 | 8/1994 | Gotoh et al. | 320/44 |
| 5,352,982 | 10/1994 | Nakazawa et al. | 324/427 |
| 5,357,203 | 10/1994 | Landau et al. | 324/427 |
| 5,369,364 | 11/1994 | Renirie et al. | 324/430 |

FOREIGN PATENT DOCUMENTS 6-102669  5/1994  Japan .

OTHER PUBLICATIONS

Microchip, Data Sheet, "TrueGauge™ MTA11200 Battery 'Fuel Gauge' and Charge Controller IC", 1993.

J. Aylor, et al., "A Battery State-of-Charge Indicator for Electric Wheelchairs", IEEE Trans. on Ind. Elec., vol. 39, No. 5, Oct. 1992, pp. 398–409.

Paper entitled "Explanation of Run Time To Go Calculation Phase 3 Micro–Ferrups (Models MD350–MD2KVA)", no date.

"Tracking internal resistance extends life of UPS batteries", Andre Perra & Joel Aguer, *I & CS*, May, 1994, pp. 77–79.

*Primary Examiner*—Edward R. Cosimano
*Assistant Examiner*—Kamini Shah
*Attorney, Agent, or Firm*—Foley & Lardner

[57] ABSTRACT

The run-time available from an uninterruptible power system is accurately determined both during supply of power from the battery to the load and during the time where power is supplied directly from an AC power system to the load. During power outages, where power is supplied from the battery through the inverter to the load, the remaining run-time is first estimated by calculation and then corrected by modification of the calculated value according to the reciprocal of the run-time slope. Alternatively, a scaling factor is used as part of the first run-time calculations and a correction factor which applies more corrective weight as the time on inverter progresses may be used. During power outages and when power is supplied from the AC power system to the load the maximum available run-time is extrapolated from a table of values representing maximum available run-times at various levels of power being supplied to the load from a fully charged battery. These values are updated after inverter runs to reflect actual system run-times. The maximum run-times are thereby adapted to reflect battery aging and other unique characteristics of the system.

36 Claims, 4 Drawing Sheets

METHOD AND APPARATUS FOR ADAPTIVE AND CORRECTIVE DETERMINATION OF BATTERY RUN-TIME IN UNINTERRUPTIBLE POWER SYSTEMS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of electrical power systems, and particularly to uninterruptible power supplies or systems which monitor system conditions such as remaining battery run-time.

BACKGROUND OF THE INVENTION

Uninterruptible power supplies or systems (commonly referred to as UPS) are used to provide back-up power to critical loads such as computer systems where a loss of line power can result in the interruption of programs and the loss of valuable data. Uninterruptible power supplies may also provide a line power conditioning function to ensure that transient spikes, low-volatage conditions, or distorted power waveforms on the AC power system do not disturb the operation of the computer which is supplied with power through the UPS. Typically, the UPS includes a battery which is interfaced through an inverter to the AC output line. When a fault occurs in the input AC power, the inverter is controlled to provide power from the battery to the AC output line at the same frequency and with substantially the same waveform as the normal input AC power.

In double conversion UPS systems, the AC power is rectified to the DC voltage which is applied, in parallel with the battery voltage, to a constantly running inverter. If the line power fails, the output inverter continues to operate, but now delivers power from the back-up power source (usually a battery) to the critical load.

In UPS systems which utilize a ferroresonant transformer, the inverter need not be running constantly since power is normally delivered from the AC power mains through the ferroresonant transformer to the load, with the ferroresonant transformer providing transient filtering of input line power and some compensation of short power disturbances. Upon detection of a power outage or brownout on the AC power lines, an AC switch can be opened to disconnect the primary of the ferroresonant transformer from the AC power mains, and an inverter is turned on to supply power from a battery to an auxiliary primary of the ferroresonant transformer which takes over the job of supplying the power to the load.

In certain other types of back-up power supplies, the AC power mains are normally connected directly to the load, and an inverter is turned on to supply power to the load typically only when the AC power mains fail. An advantage of such systems is that the direct connection of the AC power lines to the load during normal operation avoids energy loss in the auxiliary power supply and allows relatively less expensive and less complicated inverter components to be used since the inverter will be operated infrequently.

In all UPS systems which use a backup battery, the length of time during which the UPS can supply usable power from its battery to the load (the "run-time") is dependent on the state of charge of the battery and the power being drawn by the load. Since battery aging changes the characteristics of the batter, and the state of charge of the battery will decrease when power is drawn from it through the inverter and will increase as the battery is recharged, the remaining run-time of the battery is a highly variable parameter. Nonetheless, it is important to proper operation of the UPS that the available run-time be accurately estimated. For example, when the estimated run-time reaches a particularly low level during UPS operation an orderly shut down of the load system (e.g., a computer) can be carried out rather than shutting down precipitously when the UPS fails for lack of battery power. It is also desirable to be able to estimate run-time when the inverter is not operating so that an operator can anticipate the length of a power outage that the UPS can handle. However, when the inverter is not running, the battery is not loaded and, in fact, it is usually being recharged, so that loaded battery voltage is not available.

One approach to determining available run-time which has been used previously in UPS which employ microprocessor control allows the run-time to be determined during normal supply of power from the AC power system by periodically disconnecting the load from the AC power system and supplying power from the battery through the inverter. Prior to carrying out the battery test, the microprocessor calculates output load power and determines a factor which will be used in the battery test. The power drawn by the load in output watts is calculated as the sum of the instantaneous product of the output voltage and output current over a cycle divided by the number of instantaneous samples acquired for a line cycle.

The UPS then switches to inverter power and measures the voltage of the battery. The battery test calculates run-time during inverter operation as follows:

$$T_{IR} = \frac{K \times B_C \times (V_B - V_{LL})^2}{(V_{FC} - V_B) \times (P_{LD} + P_{LS})}$$

where $T_{IR}$ is the estimated remaining inverter run-time available from the battery, K is an experimentally determined constant, $B_c$ is the rated ampere hour capacity of the battery, $V_B$ is the measured DC output voltage from the battery, $V_{LL}$ is the predetermined low battery voltage set point at which the battery should no longer provide power, $V_{FC}$ is the full charge battery voltage, $P_{LD}$ is the calculated power drawn by the load in watts, and $P_{LS}$ is the loss in watts in the inverter.

The resulting run-time can be displayed to an operator or used to provide an indication if the run-time falls below a selected minimum value. As noted, this approach requires that the inverter be turned on periodically to allow the run-time to be calculated when power is being drawn from the battery. The same procedure can be used to estimate run-time when the AC power system has failed and the UPS is supplying power from the battery to the load.

U.S. Pat. No. 5,295,078 to Stich, et.al., entitled Method and Apparatus for Determination of Battery Run-Time in Uninterruptible Power System, discloses an approach to determining the available run-time on battery power in an uninterruptible power system in a highly accurate manner both during the period when power is being supplied from the battery through an inverter to the load and during normal operation where power is supplied from the AC power system to the load and the battery is being charged. In the latter case, the run-time is estimated without the need to periodically switch to inverter power to measure the battery voltage while it is supplying power to the load. In accordance with that patent, battery run-time is calculated during inverter operation using the battery terminal voltage $V_B$ measured directly from the battery. When the UPS is in line operation, however, the battery is typically being charged and $V_B$ cannot be calculated by direct measure. Instead, during the time that the battery is being charged, the open circuit battery voltage is calculated based on an initial measured opened circuit voltage, measured just prior to entering into line operation, adjusted by a factor proportional to the amount of time that the battery has been charged and based on the characteristics of the battery and the battery charger. This calculated open circuit voltage is then utilized to calculate $V_B$ under load conditions by subtracting a number proportional to the product of output current and measured battery resistance from the calculated open circuit voltage. In this way an accurate estimate of inverter battery run-time can be calculated and displayed to an operator during line operation without the necessity of periodically switching to inverter operation in order to make the calculation. Moreover, the use of an expression for run-time, which includes the sum of a term which is dependant on output current (or power) and a term that is not, more closely matches actual battery discharge characteristics than prior processes which used only a term dependant on output power.

SUMMARY OF THE INVENTION

In the present invention, the available run-time on battery power in an uninterruptible power system (UPS) is determined in a highly accurate manner both during supply of power from the battery through an inverter to the load and during normal operation where power is supplied from an AC power system to the load and the battery is being charged, using a calculation that takes into account the output power being delivered to the load during inverter and normal operation, respectively. In the former case the estimated run-time is corrected by modifying the calculated run-time according to the reciprocal of the run-time slope. This correction allows the estimated run-time to reflect more accurately the actual battery run-time available under inverter operation.

During normal line operation the run-time is estimated during charging of the battery without the need to periodically turn on the inverter to test the battery while it is supplying power to the load. Both the inverter and line operation calculations of run-time employ a table of values representing the amount of run-time available at a particular power level if the system batteries are at full charge this table initially contains values based on the manufacturer's supplied characteristics for the batteries used. The table values are updated, however, based on the system's actual experience of inverter runs at various power levels. As the system learns precise run-times, therefore, these starting values are adapted to reflect the unique characteristics of the particular system and battery employed, including battery aging. The combination of corrective and adaptive factors in the run-time calculation of the present invention increases the accuracy of the run-time calculation.

When power is supplied from the battery through the inverter to the load, such as during power outages on the AC power system, the battery terminal voltage is measured directly. The output power of the system to the load is also measured. The remaining run-time available from the battery is then determined in a procedure which utilizes the measured battery voltage, the measured output power, and system specifications including the full charge open circuit voltage of the batter, the allowable lower limit of battery voltage, and constants which reflect characteristics of the UPS system and battery. The estimated run-time will then be corrected according to the reciprocal of the run-time slope. In a variation on this procedure, the correction factor is of a varying value, applying less correction at the beginning of inverter operation and more correction as the battery discharges. In accordance with this variation, a calculated scaling factor is used, eliminating run-time calculation's dependence on measured output power. The resulting corrected estimate of run-time will more accurately reflect the actual run-time on inverter which can be expected from the battery. The corrected estimated run-time may be displayed to an operator or utilized to provide a low run-time indication if the run-time falls below a selected minimum, and may be further utilized to allow systematic shutdown of the load during UPS operation if the run-time drops below the selected minimum.

During normal operation of the UPS, when power is being supplied from the AC power system to the load and the battery is being charged using power from the AC power system, the actual output voltage from the battery will not be an indicator of the available run-time from the battery since the battery is not loaded. Moreover, the open circuit voltage of the battery is quite different if measured immediately after inverter operation and if measured after the battery has been charged for some period of time, even if the actual state of charge of the battery is the same in both cases. Because of electrochemical effects occurring during charge and discharge operations, a considerable period of time would be required after these operations ceased before the battery open circuit voltage would stabilize. Thus the run-time cannot be reliably estimated during line operation, and charging of the battery, by periodically measuring open circuit battery voltage. Since available run-time is most accurately determined based on battery conditions during inverter operation (i.e., during discharge of the battery), in the present invention the open circuit voltage from the battery is measured initially immediately after inverter operation when the battery not being charged. Then, during the time that the battery is being charged, the open circuit battery voltage is calculated based on the initial measured open circuit voltage adjusted by a factor proportional to the amount of time that the battery has been charged and based on the characteristics of the battery and the battery charger. The calculated open circuit voltage is then utilized to calculate a battery voltage under load conditions by subtracting a factor proportional to the output power from the calculated open circuit voltage. This battery resistance factor is automatically adjusted by the system to account for changes in battery characteristics over time. The calculated battery voltage under load is then utilized to calculate run-time utilizing essentially the same expression is used to calculate run-time when power was supplied from the battery to the inverter. In this matter, the inverter need not be turned on to supply power to the load solely for the purpose of testing the battery, thereby minimizing power drain on the battery and minimizing potential interruptions of power to the load as a result of switching the inverter in and out of the system. The line operation calculation of battery run-time does not employ a corrective factor as is used in the inverter operation calculation of run-time. However, the run-time determined in this manner accurately fits actual run-times measured experimentally.

Under certain conditions it is preferable that the run-time be determined not by calculation but by reference to a table of stored values representing the amount of run-time available at a particular power level if the batteries are at full charge. For example, if the system enters inverter operation with the batteries fully charged a more accurate starting estimation of run-time may be made with reference to such a table of starting values. Moreover, if during line operation of the system the batteries become fully charged, the run-time from such a table of starting values should be used in lieu of any calculated value for run-time. A starting value table in accordance with the present invention is initially populated based on manufacturer's data describing the characteristics of the UPS and the batteries employed. However, the table values are updated after each inverter run which is entered into with a fully charged battery as the system learns precise run-times after experiencing inverter runs at various power levels. The starting values are thus adapted to reflect experience with the actual unique characteristics of the particular system and batteries employed which may vary from the manufacturer's supplied characteristics and which will vary with the aging of the batteries. The combined use of the corrective factor for inverter run-time calculation and maximum run-time starting values adaptive to the characteristics of the particular system and batteries being used results in a highly accurate estimation of battery run-time in a UPS.

Further objects, features and advantages of the invention will be apparent from the following detailed description when taken in conjunction with the accompanying drawings.

DETAILED DESCRIPTION OF THE INVENTION

Figure 1:
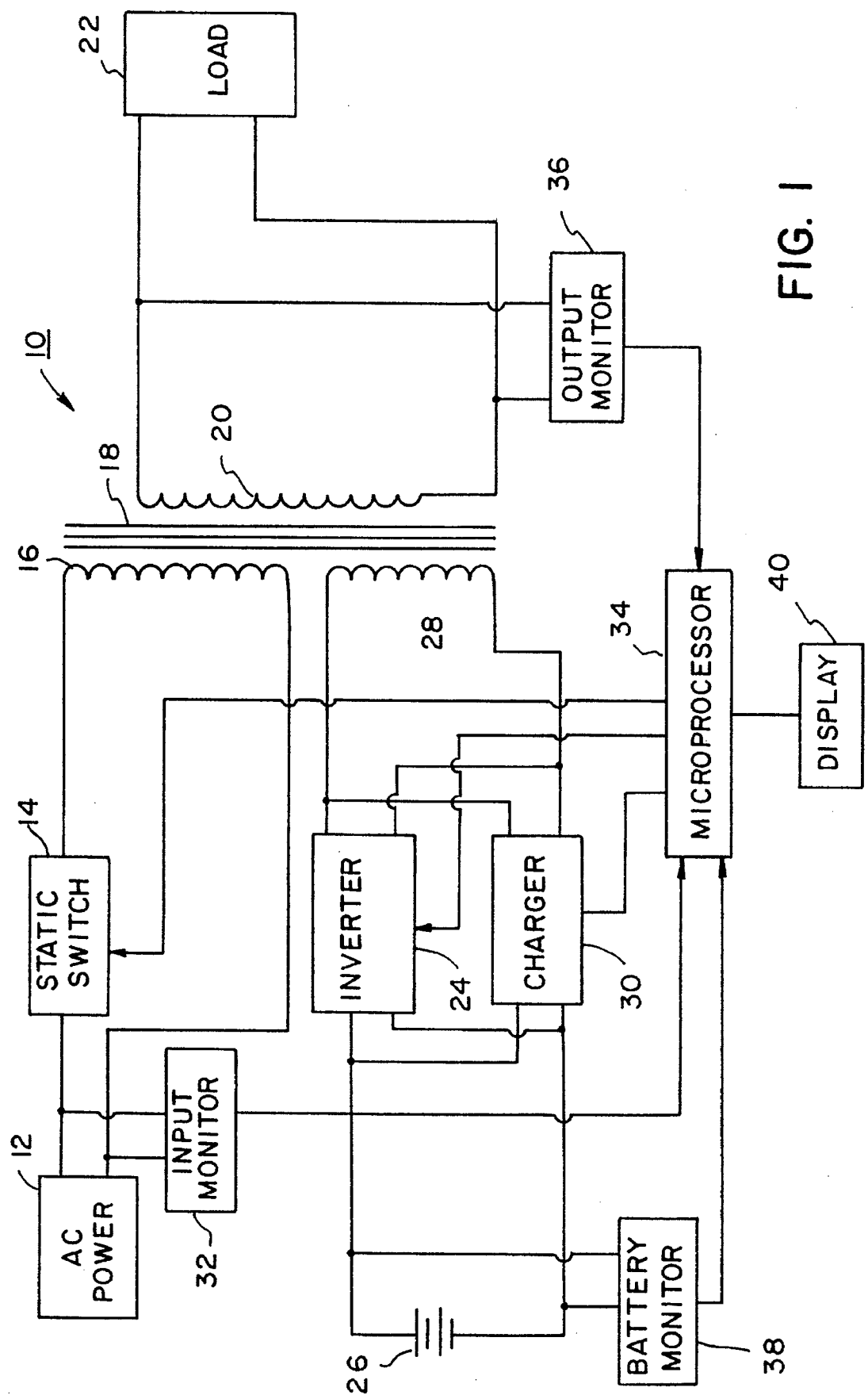
FIG. 1 is a block diagram of an exemplary uninterruptible power system which may incorporate the invention.

With reference to the drawings, an exemplary uninterruptible power system (UPS) which incorporates the invention is shown generally at 10 in FIG. 1. This block diagram is greatly simplified and illustrates the main functional units of the system and their inter-relationship. Although the exemplary UPS system 10 utilizes a transformer to couple AC and inverter power to a load it is understood that the present invention may be utilized in any type of UPS system, including double conversion type systems and systems where the AC power mains are normally connected directly to the load, to accurately determine an estimate of remaining battery run-time. In the UPS 10, AC power is normally received from the lines of an AC power system 12 (e.g., from power utility mains). The AC power is provided on a power supply path through a switching element 14 (typically including a static switch) to the primary winding 16 of a transformer 18. The AC power is thus normally coupled through the transformer 18 to the secondary windings 20 of the transformer, thereby powering the load 22. The load 22 is typically a computer system or other critical load where a loss of line power could result in the interruption of programs and the loss of valuable data. An exemplary uninterruptible power system in which the present invention may be incorporated is described in U.S. Pat. No. 5,315,533, the disclosure of which is incorporated by reference.

During the normal supply of AC power to the UPS 10 the static switch 14 is closed, providing electrical continuity therethrough and supplying AC power to the primary 16 of the transformer 18 and ultimately to the load 22. When power from the AC power source 12 fails, an inverter 24 is turned on and DC power is supplied to the inverter from an auxiliary power supply battery 26. The inverter supplies AC power to an auxiliary primary 28 of the transformer 18 which then provides output power to the load 22. To prevent backflow of power from the transformer 18 to failed AC power system 12, the static switch 14 is first turned off to cut the power flow through it before the inverter 24 supplies power to the load 22.

The battery 26 (e.g., 24 volt storage battery) is typically charged during line operation from power supplied to a battery charger 20 through the transformer 18 wherein its auxiliary primary 28 now acts as an auxiliary secondary.

An input line monitor 32 monitors the voltage from the AC power system 12 to allow a determination of when the AC power system 12 has failed completely or when its voltage has dropped from nominal voltage levels. The data generated by the input line monitor 32 is passed to a microprocesor based system controller 34. The microprocessor 34 also receives data from an output monitor 36 which monitors the voltage and current being supplied to the load 22 and a battery monitor 38 which measures the terminal voltage across the battery 26.

The microprocessor 34 functions to monitor the condition of the system and to control its various components for reaction to system conditions. The microprocessor 34 thus controls operation of the static switch 14 and inverter 24 in a coordinated manner so as to smoothly transition from line to inverter operation without disruption of the power signal being provided to the load 22. The microprocessor also employs the data received from the battery monitor to control operation of the battery charger 30. The microprocessor also uses data from the battery monitor 38 and the output monitor 36 to determine the estimated run-time available from the battery 26 while on inverter 24 operation. The result of this determination is preferably presented to the system user on a system display 40, along with other system information, which may be of any type ranging from a computer monitor to a simple LED display to include an audible alarm system. Any suitable microprocessor with conventional ROM and RAM memory, control components and input/output devices may be utilized. An exemplary suitable microprocessor is a Siemens 80C166. Such microprocessor controller systems are conventional and well known in the art.

In the present invention, the remaining inverter run-time available from the battery 26 is determined by the microprocessor 34 periodically in accordance with the following procedures. A new run-time calculation is preferably executed by the microprocessor 34 approximately every 10 seconds. In any case, the time between calculations should preferably always be greater than 10 times the resolution of the run-time equation. Each time that the run-time calculation is executed the average power being delivered to the load 22, $P_{out}$, is measured. The power drawn by the load in output watts is preferably calculated as the sum of the instantaneous product of the output voltage and output current over a cycle divided by the number of instantaneous samples acquired for a line cycle. This measurement is made whether the system is operating on line or inverter power.

During inverter operation, the following expression for calculating the run-time is preferably used:

$$t_R(n) = \left[ K_1 + \frac{K_2}{P_{OUT}(n)} \right] \frac{(V_B - V_{LL})^2}{(V_{FC} - V_B)}$$

where $t_R(n)$ is estimated available run-time on inverter for the nth iteration of the run-time calculation;

$K_1$, $K_2$ are experimentally derived constants for proportionality and for adjusting the relationship's dependence on load power;

$P_{out}(n)$ is the average output power measured while the system is on inverter at the time of the nth iteration of the run-time calculation;

$V_B$ is the measured battery terminal voltage;

$V_{LL}$ is the lower limit of battery voltage (the lowest voltage servicing a full rated load, or the level below which damage to the battery could occur); and $V_{FC}$ is the battery open circuit, full charge voltage.

It is preferable that the battery lower limit cutoff voltage, $V_{LL}$, be adjusted for varying load conditions. Thus the following equation is preferably used to determine this lower limit;

$$V_{LL} = \left[ V_{EPC} - K_{EPC} \left( \frac{P_{OUT}(n)}{\text{Capacity}} \right) \right] * (\text{\# of Cells})$$

where:

$V_{EPC}$ is the manufacturer's recommended ending volts per cell under no load conditions;

$K_{EPC}$ is the manufacturer's recommended constant to determine ending volts per cell under loaded conditions;

Capacity is the battery capacity in amp-hours; and (# of Cells) is the number of cells in the battery.

This equation is used by the run-time calculation to determine the lower limit of battery voltage shutdown under all various load conditions. It should be noted that with this equation $V_{LL}$ goes lower as power to the load increases.

The difference between two consecutive run-time calculations should be equal to the sampling interval between them. Therefore, a plot of the calculated run-time should exhibit a slope magnitude of 1. If a plot of the calculated run-time would indicate a slope of magnitude greater than 1 the run-time calculation must be weighted too heavily by the coefficient factor, $K_1 + K_2/P_{out}(n)$. That is, the run-time calculation is too high. A slope magnitude of less than 1 indicates too little weight. This problem could be the result of an improperly programmed $K_1$ and/or $K_2$, battery aging, etc. For this reason, a correction factor is applied to reduce the weight of the coefficient factor if the magnitude of the slope of the calculated run-time is too large, and increase the weight of the coefficient factor if the slope magnitude is too small. This correction is exact if the slop of the calculated run-time remaining over the discharge interval, for a constant power output, is constant. In other words, if the calculated uncorrected run-time with a constant slope were plotted along with the corrected run-time, the two plots would converge at run-time equals zero at the same point in time. It should be noted that the correction method described below could be applied to improve the performance of any reasonable method of run-time calculation, not just the method described above.

The calculated run-time is modified according to the reciprocal of the run-time slope to generate a corrected estimated run-time. The following expression is used to calculate the corrected run-time estimate:

$$t_R'(n) = \frac{t_S * t_R(n)}{t_R(n-1) - t_R(n)}$$

where:

$t_R'(n)$ is the corrected run-time estimate for the nth iteration of the run-time calculation;

$t_S$ is the sampling time, i.e., the time between iterations of the run-time calculation;

$t_R(n)$ is the uncorrected calculated run-time for the nth iteration of the run-time calculation; and $t_R(n-1)$ is the calculated uncorrected run-time for the next previous iteration of the run-time calculation.

Note that the correction factor is the reciprocal of the run-time slope. If the corrected estimated run-time has changed by less than a correction factor, preferably approximately 30 seconds, since the last calculation of the correct run-time, i.e., $|t_R'(n-1) - t_R'(n)| <$ correction factor, then the run-time to be displayed to the user, $t_{RD}(n)$, is the corrected run-time, i.e., $t_{RD}(n) = t_R'(n)$. However, if the corrected run-time estimate has changed by greater than the correction factor from the last calculation of the corrected run-time, i.e., $|t_R'(n-1) - t_R'(n)| >$ correction factor, then the estimated run-time to be displayed to the user for the present iteration, $t_{RD}(n)$, should be simply the run-time displayed for the previous iteration less the actual time elapsed between iterations, i.e., $t_{RD}(n) = t_{RD}(n-1) - \Delta T$.

Due to small variations in the sampled data from iteration to iteration, especially for low rate discharges (e.g., 10% of full load) where the granularity of the analog measurement systems in the UPS are being taxed, the calculated run-time does not produce a straight line result over-time. Since the correction method acts as a differentiation to the calculated run-time result an oscillatory behavior of the displayed run-time may be apparent when viewed over several sample intervals. The use of the correction factor check eliminates the most extreme of these oscillations. The remaining oscillatory behavior is dealt with by displaying the general trend of results rather than the instantaneous determination at each iteration. This is accomplished by displaying a moving average of the run-times to be displayed, $t_{RD}(n)$, as described below.

The straightness of the run-time calculation function has been empirically observed to be highly dependent on a correct choice of the full charge open circuit voltage of the batter, $V_{FC}$. This voltage level seems to vary considerably with the brand and state of health of the batter, and perhaps other factors. A run-time calculation which uses a full charge open circuit battery voltage derived from sampled data, rather than one that is constant for the life of the UPS unless changed by the user, will provide a straighter calculated run-time thereby increasing the precision of the correction technique and reducing the oscillations described above. The full charge open circuit battery voltage may be calculated as follows:

$$V_{FC} = 2*V_B - V_{LL}$$

where:

$V_B$ is the sampled battery voltage at the time the calculation is made; and $V_{LL}$ is the low battery cut-off point which may be calculated at the time the calculation is made as described above.

The full charge open circuit battery voltage, $V_{FC}$, should only be calculated at the beginning of an inverter run which begins with a batter charged to full capacity. Thus the full charge open circuit battery voltage is at most calculated only once per inverter run, and the value is used for the remainder of that inverter run, and subsequent inverter runs, until it is recalculated at the beginning of an inverter run which begins with a battery charged to full capacity. Also, it is known that battery voltage will actually increase for a short time at the beginning of the discharge period. This is because a short period is required for a battery's chemical reactions to reach equilibrium rates. This results in a temporarily depressed terminal voltage. Therefore, it is also preferable that the calculation of the full charge open circuit battery voltage be made when the sampled battery voltage, $V_B$, is taken just past the battery voltage peak found at the beginning of the battery discharge cycle. Note that the calculated full charge open circuit battery voltage acts to set equal the difference between the two terms of the square root of the numerator factor of the calculated run-time equation to the difference between the two terms of the denominator factor of the equation. Implementing the calculated full charge open circuit battery voltage calculation allows the calculated run-time to have a high degree of consistency and accuracy over the duration of a particular discharge.

In an alternative procedure, the full charge open circuit battery voltage, $V_{FC}$, may be calculated by storing the parameter values, $V_B$ and $V_{LL}$, of several points near, but following, the peaking of the battery voltage at the start of the battery discharge. Then the calculated run-time may be iterated over the sampled set so as to converge to the open circuit battery voltage that provides the most constant slope over the interval represented by the sample set. This is a precisely quantitative method of calculating the full charge open circuit battery voltage, $V_{FC}$, but it is not a preferred procedure since it is computationally intensive.

Another procedure for calculating a corrected run-time applies a two stage slope correction. This two stage approach eliminates the oscillations described above, therefore also eliminating the need for the correction factor check as described. The first stage in the two stage correction procedure is to calculate a scaling factor, $K_S$. First a base equation is calculated at a reference point, N:

$$\text{Base}(N) = \frac{(V_B(N) - V_{LL}(N))^2}{V_{FC}(N) - V_B(N)}$$

Once again, it is preferable that this calculation be done at the first sampling interval while on inverter operation after the peaking of battery voltage. It is also preferable that the calculated, rather than fixed, values of the lower limit of battery voltage, $V_{LL}$, and the full charge open circuit battery voltage, $V_{FC}$, be used, as described above.

For each subsequent iteration of the run-time calculation, n, a scaling factor is calculated using the following expression:

$$K_S = \frac{t_S * (n - N)}{\text{Base}(N) - \text{Base}(n)} = \frac{\Delta t}{\Delta \text{Base}}$$

where:
- $t_s$ is the time between iterations of the run-time calculation; and
- n-N is the number of iterations elapsed between the iteration where the base equation reference point was established and the current iteration of the run-time calculation.

During each consecutive computation of the scaling factor a check is made to see if the scaling factor has converged to within an arbitrary magnitude, SFERR. If the scaling factor has converged, a converged scaling factor, $K_S'$, is set to the scaling factor for the current iteration, i.e., if $|K_S(n)-K_S(n-1)|<\text{SFERR}$ then $K_S'=K_S(n)$. Note that monitoring the change of this factor is a way of monitoring the battery's state of health. As the batteries degrade, the successive conveyed scaling factors, $K_S'$, found by this method will decrease.

For each iteration of the run-time calculation a determination is then made of whether a correction is required. If a correction is required, a correction factor, $K_C$, is calculated in accordance with the following expression:

$$\text{if } t_S * (n - N) > |K'_S * \text{Base}(N) - K'_S * \text{Base}(n)| * \left(1 + \frac{1}{n-N}\right)$$

$$\text{or } t_S * (n - N) < |K'_S * \text{Base}(N) - K'_S * \text{Base}(n)| * \left(1 - \frac{1}{n-N}\right)$$

$$\text{then } K_C = \frac{t_S * (n - N)}{K'_S * \text{Base}(N) - K'_S(\text{Base}(n))}$$

else $K_C = 1$

As this expression reveals, the condition as to whether to correct the calculated run-time or not is not dependent on previous corrected results, as in the correction procedure described earlier. Instead, the allowable error between the calculated difference in run-time and the actual difference in run-time is based on a sliding percentage of the total elapsed time. The delta in calculated run-time will be allowed to deviate from the actual delta in run-time by a larger amount at the beginning of an inverter run. For example, fi the sampling interval is ten seconds, the algorithm will accept the result of anything between 0 and 20 seconds for the first iteration after iteration N. Since the error is bound to be large near the beginning of the discharge of the battery, due to the battery voltage peaking response, allowing a large error will keep the correction mechanism from over correcting. If the scaling factor, $K_S'$, was nearly correct, the absolute error should be fairly small even though the delta run-time deviates substantially from the actual elapsed time. As time progresses, the acceptable deviation from actual elapsed time is reduced, therefore, after a duration of 35 intervals of 10 seconds out of an actual 350 seconds of elapsed time, or, equivalently, a only 2.86% error in total elapsed time is tolerated.

The correction is the inverse slope of the run-time, as described above. However, for this variation, the correction factor is calculated over an increasingly longer period of time as the discharge progresses. This results in increasing accuracy as the discharge proceeds and serves to eliminate the oscillations previously noted.

If a correction is called for, the corrected run-time is calculated in accordance with the following expression:

$$t_R'(n) = K_S'(n) * K_c(n) * \text{Base}(n)$$

Over a reasonable number of intervals, this slope correction will be very accurate, resulting in a very good run-time estimation. Note that this correction uses a sliding weight, with less correction being applied early in the discharge, where the base equation slope is changing rapidly, and more weight applied as the discharge progresses and the base equation slope is more stable. Note that this method of calculating a corrected run-time is preferably only applied to inverter runs beginning with a battery charged to full capacity and exhibiting a constant power output throughout inverter operation. In cases where the power output is changing, this correction method may be used by generating a new converged scaling factor, $K_S'$, after each power change of more than an arbitrary magnitude has occurred. However, in such cases, the corrected run-time will not be accurate until the scaling factor converges after the power change. It should also be noted that in this procedure for calculating corrected run-time, the factor $K_1+K_2/P_{out}$ is replaced by the converged scaling factor $K_S'$. This technique thus does not directly require the power output in order to calculate the run-time remaining at a particular power level, but the power out, $P_{out}$, is preferably still used for other purposes as described below. It is also possible that a variation of this procedure could modify one of $K_1$ or $K_2$ rather than have a single factor that replaces both of them. K values correlated to specific power levels could be stored in, and extrapolated from, tables in memory for use in calculating the run-time. In any case, for the period before the battery voltage is past its peak or after a power change has occurred, when a new scaling factor has not yet converged, the corrected run-time may be calculated from the above equation using the converged scaling factor, $K_S'$, used during a previous inverter operation, or from before the power change, and a correction factor, $K_c=1$, i.e., an essentially uncorrected run-time.

There are several special cases in which it is preferable that the above procedures for calculating the run-time on inverter be altered. In the first case, if the power output is changing rapidly, i.e., $|P_{out}(n)-P_{out}(n-1)|>10\%$, the corrective factor should not be applied to the calculated run-time. In such a case the run-time to be displayed to the user for the nth iteration of the run-time calculation should be the uncorrected calculated run-time, i.e., $t_{RD}(n)=t_R(n)$. Also, if the calculated run-time is less than zero, i.e., $t_R(n)<0$, or the calculated run-time for the present iteration is greater than the calculated run-time for the previous iteration, i.e., $t_R(n)>t_R(n-1)$, which should never be the case during inverter operation when the battery is discharging, or the calculated run-time is greater than the maximum run-time at the measured output power level as calculated from a starting value table, i.e., $t_R(n)>T_{RO}(P_{out})$, which will be discussed in greater detail below, the calculated run-time may be presumed to be erroneous. Such erroneous calculations may be the result of erroneous measurements of the battery voltage or output power due to glitches or other noise in the system, unanticipated numerical anomalies resulting from the digital calculation methods employed, or other unaccounted for physical anomalies which can lead to results which make no sense. If such an error does occur the preferable run-time to be displayed to the user for the present iteration of the run-time calculation is the run-time displayed during the previous iteration of the run-time calculation less the actual time elapsed between calculations, i.e., $t_{RD}(n)= t_{RD}(n-1)-\Delta T$.

It is also preferable that a different procedure from the one described above be used for the first iteration of the run-time calculation following a switch from line to inverter operation. If the batteries are not at full capacity at the time of the transition from line to inverter operation the run-time to be displayed to the user will preferably depend upon whether a change in output power being supplied to the load accompanied the transition from line to inverter operation. If the power output on inverter operation has changed by more than a selected amount from the power output on line operation, e.g., $|P_{out}(INV)-P_{out}(LINE)|>10\%$, than the run-time result to be displayed to the user should be the calculated run-time, unmodified by a correction factor, i.e., $t_{RD}(n)=t_R(n)$, Otherwise, if the power output during inverter operation has changed by less than a selected amount from the power output during line operation, e.g., $|P_{out}(INV)-P_{out}(LINE)|<10\%$, then the run-time to be displayed to the user for the present iteration of the run-time calculation is preferably the last calculated run-time which, in this case, would have been calculated while on line, i.e., $t_{RD}(n)=t_{RD}(n-1)$.

If, on the first iteration of the run-time calculation following transition from line to inverter operation, the system batteries 26 are fully charged, then the run-time to be displayed to the user is preferably a starting value representing the amount of run-time available at the particular power level if the batteries are at full charge, i.e., $t_{RD}(n)= t_{RO}(P_{out})$, where $t_{RO}(P_{out})$ is an initial seed run-time value which is a function of the output power, $P_{out}$. The batteries may be considered fully charged if, on the transition from line to inverter operation, the battery charger 20 is in a charge maintenance state. The starting value, $t_{RO}$, could be extrapolated from a single value representing, for example, the maximum available run-time of a fully charged battery under full load, but, to facilitate calculation, may preferably be derived from an array of starting values. The values in such an array represent the amount of run-time available at a particular discrete power level if the batteries are at full charge. The starting value array may have, for example, 12 entries for power levels in 10% increments from 0 to 110%. The starting values in the array are initially computed upon power-up of the UPS. There are several possible mathematical estimations of full capacity battery run-time which are well known in the art and which may be used to initially populate the array. The initial values for the array for a UPS of the type shown in FIG. 1 are preferably calculated using the following expression:

$$t_{100\%} = \frac{K_{AF} * \text{Capacity} * 60 * V_{NOM}}{P_{100\%} * \text{Turns Ratio}}$$

where:

$t_{100\%}$ is the full load run-time in minutes;

Capacity is the battery capacity in amp-hours;

$K_{AF}$ is an adjustment factor for system efficiency and full load discharge rating of the batteries;

$V_{NOM}$ is the nominal output voltage, when used with the given turns ratio it is suitable for all output voltage configurations;

$P_{100\%}$ is the full load power output of the system; and

TurnsRatio is the turns ratio of the transformer from the inverter to output of the UPS.

Each of the starting table values is now computed based on the following equation:

$$t_{X\%} = \left(\frac{x}{100}\right)^{-1.5} * t_{100\%}$$

where:

$t_{x\%}$ is the initial starting value table value for X% of a full power output load, i.e., the amount of run-time available at X% of full power-out if the batteries are at full charge; and $t_{100\%}$ is the full load run-time for fully charged batteries.

An exemplary calculation of values for the initial starting value table follows. For $K_{AF}=0.7$, Capacity=33 amp hours, $P_{NOM}=240$ Volts, $P_{100\%}=5,000$ KVA and a turns ratio of 9.6, the full load run-time:

$$t_{100\%} = \frac{0.7 * 33 * 60 * 240}{5000 * 9.6} = 6.92 \text{ min.}$$

The initial starting value at 50% of full load power would then be:

$$t_{50\%} = \left(\frac{50}{100}\right)^{-1.5} * 6.92 = 19.77 \text{ min}$$

It is preferable that the initial starting values calculated using the above equations be rounded up somewhat. By deliberately approximating the initial starting values high the adaptive run-time equation, described below, will converge sooner than if the estimates are too low.

Once the starting value array has been established, it is updated after each inverter run which was entered into when the batteries were fully charged, i.e., the battery charger was in maintenance mode just before entering into inverter operation, and in which the power level during the run did not change by more than a certain amount, preferably 10%. It is also preferable that the table values not be updated where the inverter run-time was very short, e.g., less then three times the sample interval or approximately 30 seconds. The table values are updated by the last displayed run-time on inverter $t_{RD}(INV)$ plus the actual duration of the inverter run. This is the update value which is an estimate of current maximum run-time for a specific output power level based on actual experience. When the table is updated, the values that are changed are preferably only the values in the array that are immediately greater than and immediately less than the load percentage value. For example, if the load is at 54% of full load during inverter operation then the starting value table is updated for the 50% and the 60% values. The update value is extrapolated in both directions for the two new starting value table entries using an extrapolation method similar to the ones described below. This process allows the array of starting values in the table to be adapted over time based on actual run-time experience, thereby self-adjusting to allow for battery aging and other unique characteristics of the system and battery being used, while still providing an accurate run-time estimation.

When a starting value, $t_{RO}(P_{out})$, is required for a power output level that is not an exact multiple of 10% of the full load power, the starting value is preferably extrapolated from the next higher percentage in the starting value array by use of the following equation:

$$t_{RO}(\%P_{FL}) = \left(\frac{\left(\frac{next(\%P_{FL})}{100}\right)}{\left(\frac{\%P_{FL}}{100}\right)}\right)^{1.5} * \text{array}(next(\%P_{FL}))$$

where:

$t_{RO}(\%P_{FL})$ is the extrapolated starting value for power output at a specific percentage of full load power output;

next $(\%P_{FL})$ is the next higher percentage of full load power output for which there is a value in the starting value array; and array (next($\%P_{FL}$)) is the starting value from the starting value table array for the next highest percentage of full load power out from $\%P_{FL}$.

For exemplification, if the load power output is at 55% of the full load and the starting value table array value for the next higher percentage, in this case 60%, is 23 minutes, then the starting value is calculated as follows:

$$t_{RO}(55\%) = \left(\frac{\left(\frac{60}{100}\right)}{\left(\frac{55}{100}\right)}\right)^{1.5} * 23 = 26.2 \text{ min.}$$

Once a remaining run-time is determined during inverter operation, using the above described procedure, the run-time to be displayed, $t_{RD}(n)$, may be displayed to the user. Since the correction method acts as a differentiator to the displayed run-time result, which, as described above, is not a straight line function, an oscillatory behavior to the displayed run-time results may be apparent when viewed over several sample intervals. This problem is increased where the run-time to be displayed alternates between corrected and uncorrected values. However, the general trend of the run-time to be displayed, i.e., the average over several intervals, is accurate under most conditions. It is, therefore, preferable that a moving average be applied to the time remaining to be displayed. For example, the run-time remaining to be displayed may be set to three-fourths of the last run-time remaining to be displayed plus one-fourth of the current run-time remaining to be displayed, e.g., $t_{RD}(n)=(3t_{RD}(n-1)+t_{RD}(n))/4$. This will smooth out the curve of values of time remaining to be displayed. For short run-times, e.g., less than four minutes, the absolute error in the run-time calculation can be assumed to be small. For these short run-times the correction procedure need not be applied, $t_{RD}(n)=t_R(n)$, and an unaveraged result may be displayed.

After line input power returns to an acceptable level, and just prior to transfer from inverter to line operation, the battery terminal voltage, $V_B$, the corrected run-time remaining, $t_R'$, the elapsed time of battery operation, $f\Delta T$, and the output power while on inverter, $P_{out}(INV)$, are measured and/or stored. Upon returning to line operation the open circuit battery voltage, $V_{B(OC)M}$, is measured with the battery charger 30 not yet energized. At this point the starting value table is updated with information from the inverter run, and a constant, $K_3$, related to the battery resistance is calculated. $K_3$ is calculated in accordance with the following equation:

$$K_3 = \frac{V_{B(OC)M} - V_B}{P_{OUT}}$$

$K_3$ is only calculated on the first iteration of the run-time calculation following transfer from inverter to line operation. Moreover, it is preferable that if either the run-time on inverter, $t_{RO}$, has triggered a low run-time alarm or the output power $P_{out}$ is less then 25 percent of full load, a new value of $K_3$ not be calculated. In such a case, the value for $K_3$ which was last used during line operation is used.

On the first and all subsequent iterations of the run-time calculation made during line operation the following procedure is followed. First, the open circuit battery voltage is calculated as follows:

$$V_{B(OC)C} = V_{B(OC)M} + ((K_4) * \Delta t))$$

where:

$\Delta t$ is the actual time elapsed between iterations of the run-time calculation; and $K_4$ is a constant relating how the open circuit battery voltage reflects the state of battery charge as influenced by the charger constant current rating and the battery capacity. Thus:

$$K_4 = \frac{\text{Charger Current Rating}}{\text{Battery Capacity}} * \left( \frac{\Delta V_{B(OC)}}{\text{Seconds}} \right)$$

If the calculated open circuit battery voltage, $V_{B(OC)C}$, is greater than the fully charged battery voltage, $V_{FC}$, then the calculated open circuit battery voltage is set equal to the full charge battery voltage, i.e., $V_{B(OC)C} = V_{FC}$.

The battery voltage under load is then calculated as follows:

$$V_{BC} = V_{B(OC)C} - K_3 \times P_{out}(\text{LINE})$$

where:

$V_{BC}$ is the calculated battery terminal voltage; and $P_{out}(\text{LINE})$ is the average power being delivered to the load while on line.

At this point the run-time remaining is calculated as:

$$t_R(n) = \left[ K_1 + \frac{K_2}{P_{OUT}(n)} \right] * \frac{(V_{BC} - V_{LL})^2}{(V_{FC} - V_{BC})}$$

The calculated run-time, $t_R(n)$, will usually be displayed to the user as an estimate of inverter run-time, $t_{RD}(n)$. This will almost always be the case where the power output on line has changed by more than a certain amount from the last power output while on inverter, e.g., $|P_{out}(\text{LINE}) - P_{out}(\text{INV})| > 10\%$. However, where the power output has remained relatively steady, $|P_{out}(\text{LINE}) - P_{out}(\text{INV})| > 10\%$, an alternative estimate of inverter run-time is preferably displayed to the user in some cases. For example, if the calculated run-time for the present iteration of the run-time calculation is less than the last displayed run-time on inverter, $t_{RD}(n) < t_{RD}(\text{INV})$, it can be assumed that an error has occurred in that the estimated run-time should not be decreasing while the battery is being charged. Such an error could result from an erroneous measurement of $P_{OUT}(n)$ due to a glitch or other noise in the system, unanticipated numerical anomalies resulting from the digital calculation methods employed, or other unaccounted for physical anomalies which can lead to erroneous results. In such a case the run-time to be displayed to the user for the present iteration of the run-time calculation should be the same as the last run-time displayed while an inverter, i.e., $t_{RD}(n) = t_{RD}(\text{INV})$. This procedure also provides estimation continuity between inverter and line operation calculations allowing transition to the latter. Also, if the calculated run-time for the current iteration of the run-time calculation is greater than the last displayed run-time plus the elapsed time of battery operation, i.e., $t_R(n) > t_{RD}(\text{INV}) + f\Delta t$, the run-time displayed to the user should be set at the last run-time displayed while on inverter plus the elapsed time of battery operation while last on inverter operation, i.e., $t_{RD}(n) = t_{RD}(\text{INV}) + f\Delta t$. This assures that the estimated run-time will not exceed the maximum possible run-time which should be the time on inverter plus the run-time remaining just before the system returned to line operation, assuming the system entered inverter operation with the batteries fully charged.

Finally, it is always preferable that an estimated run-time calculated during line operation not exceed the maximum run-time for a fully charged battery under the present output power level as reflected in the starting table. Therefore, it is preferable that if the estimated run-time to be displayed is greater than the value in the table for the percentage of full load power which is the next higher from the percentage of full power currently being provided to the load, i.e., $t_{RD}(n) > \text{array (next}(\%P_{out}(n)))$, that the estimated run-time to be displayed to the user be set at that maximum value from the table i.e., $t_{RD}(n) = \text{array (next}(\%P_{out}(n)))$.

Whether on line or inverter operation, the run-time remaining to be displayed to the user, $t_{RD}$, is made available by the microprocessor 34 for display to the user on the system display 40, preferably with a warning signal automatically provided if the run-time drops below a preselected minimum level during inverter operation. The run-time is preferably displayed to the nearest minute for run-times over a certain limit, preferably 3 minutes, and to the nearest 10 seconds for run-times below that limit. The remaining run-time may also may be made available by the microprocessor 34 to auxiliary equipment, such as a computer protected by the UPS, through a communications port (e.g., an RS232 port, not shown).

Figure 2:
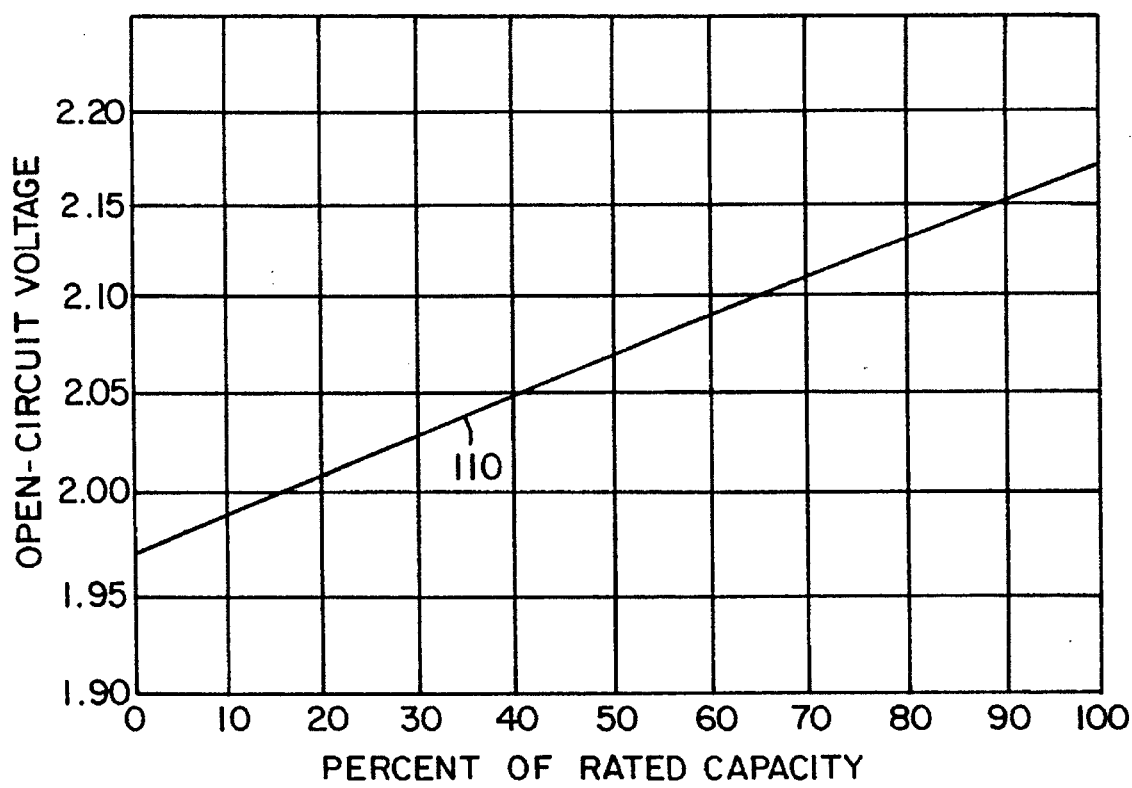
FIG. 2 is a graph illustrating the typical linear relationship between open circuit battery voltage and state of charge of the battery.
Figure 3:
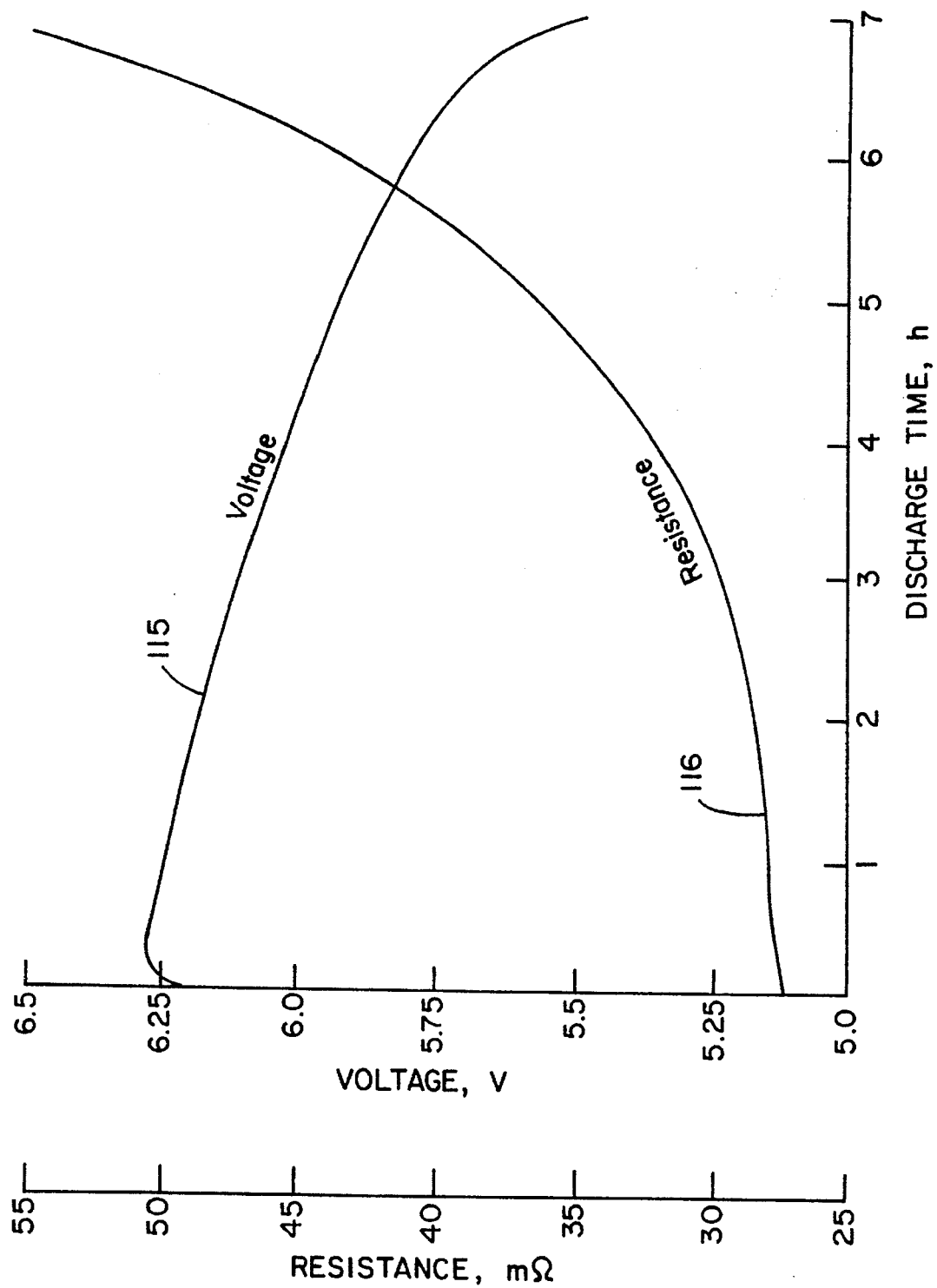
FIG. 3 are graphs illustrating battery resistance and battery voltage over time during discharge.
Figure 4:
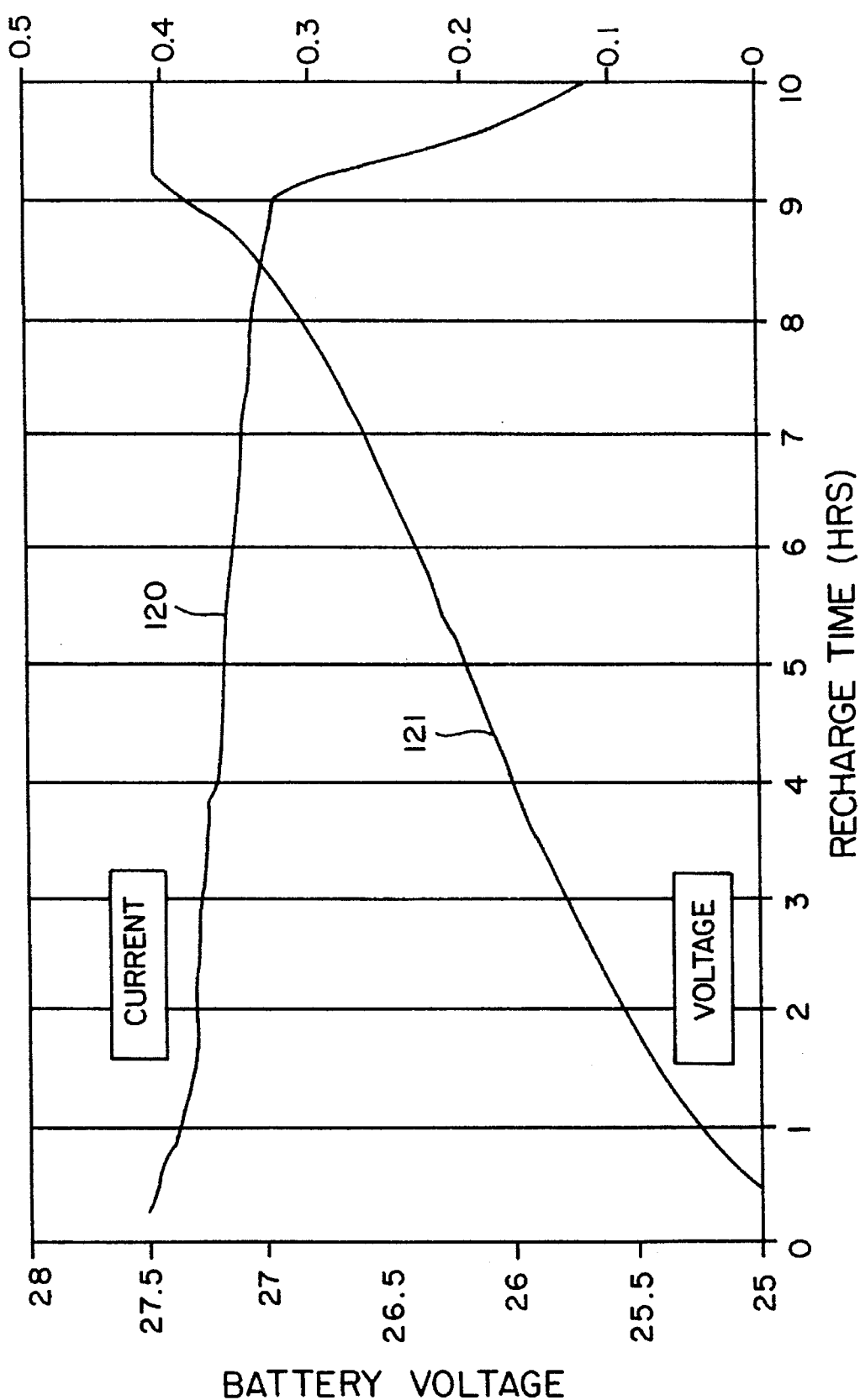
FIG. 4 are graphs illustrating typical charging current and battery voltage over time during charge.

The graph 110 of FIG. 2 illustrates the typical linear relationship between open circuit battery voltage and state of charge for an exemplary sealed lead-acid battery. This linear relationship allows estimations of run-time to be made with reasonable accuracy. Typical relationships between battery voltage and resistance during battery discharge are shown by the graphs 115 and 116, respectively, of FIG. 3. These graphs illustrate that battery resistance increases fairly slowly until deep discharge is reached, a condition seldom encountered during UPS operations. Consequently, the calculation of $K_3$ as described above during line operation will have satisfactory accuracy. FIG. 4 shows graphs 120 and 121 of current and voltage, respectively, versus recharge time for a typical sealed lead-acid battery. These data may be used to determine the constant $K_4$ for the battery being utilized in the UPS.

The following is an exemplary program for the microprocessor 34 to carry out the run-time estimation as described above.

```
/******************************************************************************/
#include "f2.h"

/**********************************************
 Runtime   SUBROUTINE
 Frequency:
**********************************************/ define deltaRT         10
define CORRECTIONLIMIT 30
static bit SystemIsShutdown = TRUE;
static bit PowerWasStable   = FALSE;
static bit UpdateSeed       = FALSE;
static uint time_on_inverter = 0;

uint tempPOUT;
uint temp;

ulong ulong_accumulator1;
ulong ulong_accumulator2;
static ulong PowerOnInverter;
static uint LastDisplayedRT = 594;

extern uint AdaptedSeedRT[];
        uint ChoosePercentPower(uint);
        uint ComputeSeed(void);
        uint PercentPower;
        void UpdateSeedArray(void);

void ComputeRuntime(void)

extern ulong ulong_accumulator1;
    extern ulong ulong_accumulator2;
    extern uint temp;
    extern uint tempPOUT;
    extern bit SystemIsShutdown;
    extern bit PowerWasStable;
    extern bit UpdateSeed;
```

- 33 -

```
static uint charge_accumulator = 0;
static uint line_runtime_flag = 0;
static uint thisRT = 0;
static uint displayedRT = 594;
static uint lastRT = 0;
static uint seedRT = 0;
static uint lineRT = 0;
static ulong ulong_RuntimeK3 = 0;
static bit PowerChanged = TRUE;
static bit FirstPassInv = TRUE;
static bit FirstPassLine = TRUE;
static uint PowerOnLine;
static uint LastCorrectedRT = 0;

uint  vbat_adjustment;
uint  estimated_vbat;
uint  CorrectedRT;

if(CalibratedWOUT < 50)
    tempPOUT = 50;
else
    tempPOUT = (uint)CalibratedWOUT;

if(AlarmStatus.part.low_battery    SystemIsShutdown)
    charge_accumulator =  ;
    line_runtime_flag =  ;
    AlarmStatus.part.low_runtime = 0;
    SystemIsShutdown = FALSE;
    if(AlarmStatus.part.low_battery) {
        if(UpdateSeed) UpdateSeedArray();
        if(!(ControlFlags & LineOk) )
            VBatOCM = CalibratedVBAT;
    }

}
else
    if( !(ControlFlags & LineInteractive) ) {/* Sytem mode = ON_INVERTER */

/* evaluate runtime equation */

/*              K1  -  K2    .(VBAT - LOBAT)^2 * 60
                    ------*(-------------------------
                     POUT )   (VBMAX - VBAT) * 100
       Runtime(inv) = -----------------------------------------
                                    256 where K1 and K2 are scaled up by 256 and battery voltages are
        scaled up by 100; the *60 gives Runtime in seconds               */ vbat_inverter = CalibratedVBAT;
    ulong_accumulator1 = CalibratedVBAT - LowBatterySetpoint;
    ulong_accumulator1 *= ulong_accumulator1*60;
    if(CalibratedVBAT >= FullChrgOCVolts)
        ulong_accumulator2 = 100;
    else
        ulong_accumulator2 = ((ulong)FullChrgOCVolts - CalibratedVBAT)*100;
    ulong_accumulator1 /= ulong_accumulator2;
    ulong_accumulator2 = (ulong)RuntimeK1Prime + RuntimeK2Prime/tempPOUT;
    ulong_accumulator1 *= ulong_accumulator2;
    ulong_accumulator1 = ulong_accumulator1>>8;
    thisRT = ulong_accumulator1;

if(ulong_accumulator1 > (ulong)5940) ulong_accumulator1 = (ulong)5940;
```

- 34 -

```c
if(FirstPassInv) {
    FirstPassInv = FALSE;
    if(old_cngr_mode == Maintenance) {        /* Full Capacity */
        temp = ChoosePercentPower(tempPOUT);
        thisRT = seedRT = ComputeSeed();
        displayedRT = seedRT;
        LastDisplayedRT = displayedRT/10;
        PowerWasStable = TRUE;
    }
    else {                                     /* Less than full capacity */
        if(10*abs(tempPOUT-PowerOnLine) > PowerOnLine)
            displayedRT = thisRT;   /* Computed above in seconds */
        else
            displayedRT *= 10;      /* Computed on line in 10 sec incr*/
        PowerWasStable = FALSE;
    }
    time_on_inverter = 0;
}
else {
/* Adaptive portion; the divide by 10s convert runtime back to
   10 second quantums                                         */ if((10*abs(tempPOUT - (uint)PowerOnInverter)) < (uint)PowerOnInverter) {
    if(  (thisRT)
      && ( (!PowerWasStable)
        || ( PowerWasStable && (thisRT < seedRT)))
      && (thisRT < lastRT)   ) {
            CorrectedRT = (deltaRT * thisRT) /
                          (lastRT - thisRT);
            displayedRT = (abs(CorrectedRT-LastCorrectedRT)
                            > CORRECTIONLIMIT)
                            && (PowerWasStable)) ?
                          (LastDisplayedRT*10 - deltaRT):CorrectedRT;
            LastCorrectedRT = CorrectedRT;
    }
    else {
            LastCorrectedRT = ((deltaRT * thisRT) /
                               (lastRT - thisRT));
            if(LastDisplayedRT)
                displayedRT = (LastDisplayedRT*10 - deltaRT);
    }
}
else {
    PowerWasStable = FALSE;
    LastCorrectedRT = displayedRT = thisRT;
} if(displayedRT > 240)
    displayedRT = (3*LastDisplayedRT + displayedRT/10)/4;
else
    displayedRT = thisRT/10;
LastDisplayedRT = displayedRT;

time_on_inverter++;
if(time_on_inverter > 3) {
    line_runtime_flag = 0;
    UpdateSeed = TRUE;
}
if(!line_runtime_flag){
    line_runtime_flag = 0;
    charge_accumulator = 0;
}
PowerChanged = FALSE;
lastRT = thisRT;
PowerOnInverter = tempPOUT;
```

- 35 -

```
      FirstPassLine = TRUE;
      } else {  /* System is not on Inverter */
    if (FirstPassLine) {
        if(    (!AlarmStatus.part.low_runtime )
            && (!MeasureVBatOCM) /* Do not complete until OCM is known */
            && (PercentLoad > 24) ) {
            ulong_RuntimeK3 = (((ulong)VBatOCM - vbat_inverter)<<10)
                              / PowerOnInverter;
            if(UpdateSeed) UpdateSeedArray();
            FirstPassLine = FALSE;
            }
        }
    FirstPassInv = TRUE;

if((CHGR_ON)                          &&
       (VBatOCM < CalibratedVBAT)         &&
       (VBatOCM < FullChrgOCVolts) ) {
           charge_accumulator += RuntimeK4Prime;
           if(charge_accumulator > 999) {
               VBatOCM++;  /* actual units = .1V */
               charge_accumulator -= 1000;
               }
           }

/* Compute estimated VBAT on inverter */ vbat_adjustment = (ulong_RuntimeK3 * tempPOUT)>>10;
    if(VBatOCM < FullChrgOCVolts)
        estimated_vbat = VBatOCM - vbat_adjustment;
    else
        estimated_vbat = FullChrgOCVolts - vbat_adjustment;

/* evaluate runtime equation */
    /*              (K1 -    K2 ) ( (EstVB - LOBAT)^2 * 6  )
                    ------)*(----------------------------)
                      POUT ) (  (VBMAX - EstVB) * 100     )
       Runtime(line) = ---------------------------------------------
                                      256 where K1 and K2 are scaled up by 256 and battery voltages are
    scaled up by 100; the *6 gives Runtime in 10 seconds/count
    */ ulong_accumulator1 = estimated_vbat - LowBatterySetpoint;
    ulong_accumulator1 *= ulong_accumulator1*6;
    if(estimated_vbat >= FullChrgOCVolts)
        ulong_accumulator2 = 100;
    else
        ulong_accumulator2 = ((ulong)FullChrgOCVolts - estimated_vbat)*100;
    ulong_accumulator1 /= ulong_accumulator2;
    ulong_accumulator2 = (ulong)RuntimeK1Prime + RuntimeK2Prime/tempPOUT;
    ulong_accumulator1 *= ulong_accumulator2;
    ulong_accumulator1 = ulong_accumulator1>>8;
    if(ulong_accumulator1 > (ulong)594) ulong_accumulator1 = (ulong)594;
    lineRT = ulong_accumulator1;
    line_runtime_flag = 1;
                                 /* FullLoadSetpoint already mult by 0.1   */
    PowerOnLine = tempPOUT;
    if( (PowerChanged)
      ||((10*abs((uint)PowerOnInverter-tempPOUT)) > (uint)PowerOnInverter)) {
        PowerChanged = TRUE;
        displayedRT = ulong_accumulator1;
        }
```

- 36 -

```
        else
            if( (ulong_accumulator1 > (ulong)LastDisplayedRT)    &&
                (ulong_accumulator1 < (ulong)(LastDisplayedRT) - time_on_inverter)) ) {
                displayedRT = ulong_accumulator1;
            }
            else {
                if(ulong_accumulator1 < (ulong)LastDisplayedRT)
                    displayedRT = LastDisplayedRT;
                if(ulong_accumulator1 > (ulong)(LastDisplayedRT) - time_on_inverter))
                    displayedRT = LastDisplayedRT + time_on_inverter;
            } temp = ChoosePercentPower(tempPOUT);
    if(displayedRT > (AdaptedSeedRT[temp]/10))
        displayedRT = AdaptedSeedRT[temp]/10;
    } if(displayedRT > 594) displayedRT = 594;    /* Limit reported runtime to 99:00 */
        /* If runtime > 10:00, report whole mins; else mins and nearest
           10 seconds                                                   */
    if(displayedRT > 60)
        Runtime = ((displayedRT%6) > 3) ? ((displayedRT/6 + 1) * 60):((displayedRT/6) * 6
        }
    else
        Runtime = displayedRT*10;
} void UpdateRuntimeAlarm(void)
            /* runtime alarm processing */
            /* Note:  Runtime is in units of seconds while
                      LowRuntimeSetpoint is in units of minutes */
    if((SystemMode() != SYSTEM_ON_INVERTER) || AlarmMask.part.low_runtime) {
        AlarmStatus.part.low_runtime = 0;
    }
    else if(Runtime <= LowRuntimeSetpoint * 60) {
        AlarmStatus.part.low_runtime = 1;
    }
    else if(Runtime >= (LowRuntimeSetpoint * 60) - 30)
        AlarmStatus.part.low_runtime = 0;
    } uint ChoosePercentPower(uint power)

extern uint FullLoadSetpoint;

/* Compute percent power */
    PercentPower = (power/FullLoadSetpoint);
    /* Limit percent power so array index range not violated   */
    PercentPower = (PercentPower > 10) ? 10:PercentPower;
    /* Choose seed value */
    return PercentPower;
}

/******************************************************************************

SUBROUTINE: ComputeSeed

FUNCTION:   Extrapolates a seed value for the runtime algorithm from actual
            values previously stored in the AdaptedSeedRT array. For full
            battery capacity runs, the more accurate the seed value, the
            more accurate will be the displayed runtime value when the
```

- 37 - runtime is long.

FREQUENCY:  This algorithm is only used for the first computation after
            transferring from line to inverter, and then only if the
            batteries are at full capacity.

EXPECTS:    Nothing--uses global variables.

RETURNS:    A value of runtime, in seconds, used for the intial value
            displayed and for the transition of the algorithm from
            simply displayed values decremented by deltaRT to corrected or
            computed values.

*****************************************************************************/ uint ComputeSeed(void) { extern uint temp;
extern uint tempPOUT;
extern uint AdaptedSeedRT[];

extern ulong ulong_accumulator1;
extern ulong ulong_accumulator2;

/*                                                              1.5
                                    NextHighestTenPercentIndex
        seedRT = AdaptedSeedRT[n] * -------------------------
                                         ActualPercentPower
                                                                    */
        /* Calculate actual percent of watts                         */
        ulong_accumulator2 = ((ulong)tempPOUT*10)
                              /FullLoadSetpoint;
        /* Choose next highest approximate percent of watts          */
        ulong_accumulator1 = (temp + 1)*1000;
        /* Find ratio of the two percentages                         */
        ulong_accumulator1 /= ulong_accumulator2;
        /* Take result to the 1.5 power                              */
        ulong_accumulator1 *= sqrt32(ulong_accumulator1);
        /* Multiply seed array value to estimate the seed
           value                                                     */
        ulong_accumulator1 *= (ulong)AdaptedSeedRT[temp+1];
        /* remove scaling                                            */
        ulong_accumulator1 /= 1000;
        return (uint)ulong_accumulator1;

} void UpdateSeedArray(void) { extern ulong ulong_accumulator1;
    extern ulong ulong_accumulator2;
    extern uint temp;
    extern uint time_on_inverter;
    extern bit PowerWasStable;

uint count;

temp = ChoosePercentPower((uint)PowerOnInverter);
    if( (time_on_inverter > 3 )         &&  /* 3 * 10 seconds      */
        (old_chgr_mode == Maintenance)  &&  /* Full batt capacity  */
        (PowerWasStable)                &&  /* During inv run      */
        (temp < 11) ) {                     /* in power range      */
        /* Calculate an extrapolated value for the seed value--
           which is used at the beginning of an inverter run if

- 38 - batteries are at full capacity (ChargerMode = Maintenance).
The equation below is descriptive--
scaling factors are applied implicitly in the
implementation of the equation and values are computed
for both adjacent 10% power levels to the actual power:

$$AdaptedSeedRT = ActualRT * \frac{ActualPercentPower}{NextAdjacentPowerArrayIndex}^{1.5}$$

```
for(count = 0; count<2; count++) {
    /* Disallow divide by zero                                   */
    if(!temp) count++;
    /* Calculate actual percent of watts                         */
    ulong_accumulator1 = (ulong)PowerOnInverter*1000;
                         FullLoadSetpoint;
    /* Choose an adjacent approximate percent of watts           */
    ulong_accumulator2 = (temp - count)*10;
    /* Find ratio of the two percentages                         */
    ulong_accumulator1 = ulong_accumulator2;
    /* Take result to the 1.5 power                              */
    ulong_accumulator1 *= sqrt32(ulong_accumulator1);
    /* Multiply actual runtime realized to estimate the seed
       value for the next highest percent of watts               */
    ulong_accumulator1 *= (LastDisplayedRT - time_on_inverter);
    /* remove scaling                                            */
    ulong_accumulator1 /= 100;
    AdaptedSeedRT[temp - count] = (uint)ulong_accumulator1;
    }
}

UpdateSeed = FALSE;
```

What is claimed is:

1. A method of determining the run-time during which power can be supplied from a battery through an inverter of an uninterruptible power supply to a load while such power is being supplied to the load, comprising the steps of:

(a) determining a calculated remaining run-time $t_R(n)$ available during which the battery can supply power to the load for a current iteration n of the run-time determination;

(b) determining a corrected remaining run-time $t_R'(n)$ in accordance with the expression:

$$t_R'(n) = \frac{t_S * t_R(n)}{t_R(n-1) - t_R(n)}$$

where:

$t_S$ is a time period between iterations of the run-time determination, and $t_R(n-1)$ is the calcuate remaining run-time determined during a next previous iteration of the run-time determination; and (c) setting an estimated determined run-time $t_{RD}(n)$ to the corrected run-time $t_R'(n)$ if the corrected run-time does not vary by more than a selected correction factor from a corrected run-time $t_R'(n-1)$ determined during a next previous iteration of the run-time determination, otherwise setting $t_{RD}(n)$ to an estimated determined run-time $t_{RD}(n-1)$ from a previous iteration of the run-time determination less an amount of time $t_S$ elapsed since the previous iteration.

2. The method of claim 1 wherein the step of determining the calculated remaining run-time comprises the steps of:

(a) determining the power level supplied to the load;

(b) measuring the battery voltage while the battery supplies power to the load; and (c) determining the calculated remaining run-time in accordance with the expression $$t_R(n) = \left[ K_1 + \frac{K_2}{P_{OUT}(INV)} \right] \frac{(V_B - V_{LL})^2}{(V_{FC} - V_B)}$$

where:

$K_1$ and $K_2$ are predetermined constants, $V_{LL}$ is the lower limit of battery voltage below which the battery should not supply power, $V_{FC}$ is the full charge voltage of the battery, $V_B$ is the measured battery voltage while the battery supplies power to the load, and $P_{out}(INV)$ is the average power level supplied to the load while the battery supplies power to the load.

3. The method of claim 2 wherein $V_{LL}$ is varied depending on the power level supplied to the load.

4. The method of claim 2 wherein $V_{FC}$ is varied at a start of a period where the battery is supplying power to the load depending on $V_B$ and $V_{LL}$ at the start of the period.

5. The method of claim 1 further including the additional steps of calculating a moving average of estimated determined run-times $t_{RD}(n)$ from a plurality of iterations of the run-time determination and providing a display to an operator of the moving average of the estimated determined run-times $t_{RD}(n)$.

6. The method of claim 1 further including the additional steps of determining a rate of change of the level of power supplied to the load while the battery supplies power to the load and setting the estimated determined run-time $t_{RD}(n)$ equal to the calculated run-time $t_R(n)$ if the rate of change of the level of power supplied to the load is changing by greater than a selected rate.

7. The method of claim 1 further including the additional steps of setting the estimated determined run-time $t_{RD}(n)$ equal to the estimated determined run-time (n−1) from a next previous iteration of the run-time determination less the amount of time elapsed since the last iteration if the calculated remaining run-time $t_R(n)$ is less than 0, the calculated remaining run-time $t_R(n)$ is greater than the calculated run-time $t_R(n-1)$ determined during the next previous iteration, or the calculated remaining run-time $t_R(n)$ is greater than a predetermined maximum battery run-time.

8. The method of claim 1 further including the additional steps of determining if the battery is in a fully charged state before start of the inverter supplying power to the load and determining a rate of change of the level of power supplied to the load and wherein:

(a) the corrected remaining run-time $t_R'(n)$ is not determined during a first iteration of the run-time determination following the start of the inverter supplying the power to the load;

(b) if the battery is in a fully charged state at the first iteration, the estimated determined run-time $t_{RD}(n)$ is set to a pre-determined maximum remaining run-time at the power output level;

(c) if the power level supplied to the load at the first iteration is changing at a rate greater than a selected rate, the estimated determined run-time $t_{RD}(n)$ is set at a remaining run-time determined prior to the start of the inverter supplying power to the load; and (d) otherwise, at the first iteration the estimated terminated run-time $t_{RD}(n)$ is set at the calculated run-time $t_R(n)$.

9. The method of claim 8 wherein the maximum remaining run-time at the power level supplied to the load is determined by extrapolation from a table of one or more predetermined maximum run-times and wherein the table is updated after an inverter run period where the inverter starts supplying power to the load from a fully charged battery then stops supplying power to the load, based on a last run-time displayed during the inverter run period and a duration of the inverter run period.

10. The method of claim 1 further including the additional steps of:

(a) determining when power is available from an AC power system, (b) measuring and storing the then existing values of the power supplied to the load $P_{out}(INV)$ and the battery terminal voltage $V_B$;

(c) discontinuing the supply of power from the battery to the load and supplying power from the AC power system to the load when power is available from the AC power system;

(d) measuring the open circuit battery voltage $V_{B(OC)M}$ after power is no longer supplied from the battery to the load;

(e) then recharging the battery at a known rate from the AC power system;

(f) determining the power level supplied to the load $P_{OUT}(LINE)$ while power is supplied to the load from the AC power system;

(g) determining a constant $K_3$ after power is no longer supplied from the battery to the load in accordance with the following expression:

$$K_3 = \frac{V_{B(OC)M} - V_B}{P_{OUT}(INV)} ;$$

(h) determining an estimate of the open circuit battery voltage $V_{B(OC)C}$ in accordance with the following expression:

$$V_{B(OC)C} = V_{B(OC)M} + ((K_4) * \Delta t))$$

where $K_4$ is a predetermined constant indicative of the rate of recharge of the battery and $\Delta t$ is the total time elapsed since the battery has started to be charged;

(i) then determining an estimated battery voltage under load $V_{BC}$ in accordance with the expression $$V_{BC} = [V_{B(OC)M}]V_{B(OC)C} - K_3 X P_{OUT}(LINE);$$

(j) then determining an estimated run-time $t_R(LINE)$ during supply of power to the load from the AC power system in accordance with the expression:

$$t_R(LINE) = \left[ K_1 + \frac{K_2}{P_{OUT}(LINE)} \right] * \frac{(V_{BC} - V_{LL})^2}{(V_{FC} - V_{BC})} ; \text{ and}$$

(k) setting the estimated determined run-time $t_{RD}(n)$ to the estimated run-time $t_R(LINE)$.

11. The method of claim 10 wherein if the estimated determined run-time $t_{RD}(n)$ is greater than a predetermined maximum available run-time at the power level supplied to the load $P_{OUT}(LINE)$ then the estimated determined run-time $t_{RD}(n)$ is set equal to the predetermined maximum available run-time at $P_{OUT}(LINE)$.

12. The method of claim 11 wherein the maximum available run-time at the power output level is determined by extrapolation from a table of values of predetermined maximum run-times at various power output levels and wherein the table is updated after an inverter run period where the inverter starts supplying power to the load from a fully charged battery and stops supplying power to the load, based on a last run-time displayed during the inverter run period and a duration of the inverter run period.

13. The method of claim 10 wherein if the last estimated determined run-time $t_{RD}(n)$ during inverter operation is less than a selected low run-time alarm value or the power level supplied to the load $P_{out}(INV)$ is below a minimum power level then $K_3$ is not determined but is set to a previous value of $K_3$.

14. The method of claim 10 wherein if $P_{OUT}(LINE)$ has changed by less than a selected amount from the power level supplied to the load while the load was supplied with power from the inverter $P_{OUT}(INV)$ and the estimated run-time $t_R(LINE)$ is less than a last estimated determined run-time while the load was supplied with power from the inverter then the estimated determined run-time $t_{RD}(n)$ is set equal to the last estimated determined run-time while the load was supplied with power from the inverter.

15. An uninterruptible power system connectable to AC power system lines at its input terminals and to a load at its output terminals, comprising:

(a) an auxiliary power supply battery;

(b) a power supply path from the input terminals to the output terminals to normally supply power from an AC power system connected to the input terminals to a load connected to the output terminals;

(c) means, including an inverter, responsive to control signals for interrupting the supply of power through the power supply path from the AC power system lines to the load and for selectively providing AC power from the battery to the power supply path through the inverter and thence to the load;

(d) control means for providing control signals, upon occurrence of a line fault on the AC power system lines, to the means responsive to control signals to cause the supply of power to the load to be transferred from the AC power system to the battery and from the battery back to the AC power system when power is available therefrom;

(e) means for determining a calculated remaining run-time $t_R(n)$ available during which the battery can supply power to the load for a current iteration n of a run-time determination;

(f) means for determining a corrected remaining run-time $t_R'(n)$ in accordance with the expression:

$$t_R'(n) = \frac{t_S * t_R(n)}{t_R(n-1) - t_R(n)}$$

where:

$t_S$ is a time period between iterations of the run time determination, and $t_R(n-1)$ is the calculated remaining run-time determined during a next previous iteration of the run-time determination; and (g) means for setting an estimated determined run-time $t_{RD}(n)$ to the corrected run-time $t_R'(n)$ if the corrected run-time does not vary by more than a selected correction factor from a corrected run-time $t_R'(n-1)$ determined during a next previous iteration of the run-time determination, otherwise setting $t_{RD}(n)$ to an estimated determined run-time $t_{RD}(n-1)$ from a previous iteration of the run-time determination less an amount of time $t_S$ elapsed since the previous iteration.

16. The uninterruptible power system of claim 15 wherein:

(a) the control means further includes means for determining the power level supplied to the load during supply of power to the load from the battery and for measuring the battery voltage while the battery supplies power to the load; and (b) the means for determining the calculated remaining run-time $t_R(n)$ calculates in accordance with the expression:

$$t_R(n) = \left[ K_1 + \frac{K_2}{P_{OUT}(INV)} \right] \frac{(V_B - V_{LL})^2}{(V_{FC} - V_B)}$$

where:

$K_1$ and $K_2$ are predetermined constants, $V_{LL}$ is the lower limit of battery voltage below which the battery should not supply power, $V_{FC}$ is the full charge voltage of the battery, $V_B$ is the measured battery voltage while the battery supplies power to the load, and $P_{out}(INV)$ is the average power level supplied to the load while the battery supplies power to the load.

17. The uninterruptible power system of claim 16 including additionally means for varying $V_{LL}$ depending on the power level supplied to the load.

18. The uninterruptible power system of claim 16 including additionally means for varying $V_{FC}$ at a start of a period where the battery is supplying power to the load depending on $V_B$ and $V_{LL}$ at the start of the period.

19. The uninterruptible power system of claim 15 further including means for calculating a moving average of estimated determined run-times $t_{RD}(n)$ from a plurality of iterations of the run-time determination and for providing a display to an operator of the moving average of the estimated determined run-times $t_{RD}(n)$.

20. The uninterruptible power system of claim 15 further including means for determining a rate of change of the level of power supplied to the load while the battery supplies power to the load and for setting the estimated determined run-time $t_{RD}(n)$ equal to the calculated run-time $t_R(n)$ the rate of change of the level of power supplied to the load is changing by greater than a selected rate.

21. The uninterruptible power system of claim 15 further including means for setting the estimated determined run-time $t_{RD}(n)$ equal to the estimated determined run-time $t_{RD}(n-1)$ from a next previous iteration of the run-time determination less the amount of time elapsed since the last iteration if the calculated remaining run-time $t_R(n)$ is less than zero, the calculated remaining run-time $t_R(n)$ is greater than the calculated run-time $t_R(n-1)$ determined during the next previous iteration, or the calculated remaining run-time $t_R(n)$ is greater than a predetermined maximum battery run-time.

22. The uninterruptible power system of claim 15 further including means for determining if the battery is in a fully charged state before a start of the inverter supplying power to the load and for determining a rate of change of the level of power supplied to the load and wherein the means for determining the corrected remaining run-time does not determine a corrected run-time $t_R'(n)$ during a first iteration of the run-time determination following the start of the inverter supplying the power to the load, and if the battery is in a fully charged state at the first iteration, the estimated determined run-time $t_{RD}(n)$ is set by the means for setting to a pre-determined maximum remaining run-time at the power output level, and if the power level supplied to the load is changing at a rate greater than a selected rate, the estimated determined run-time $t_{RD}(n)$ is set at a remaining run-time determined prior to the start of the inverter supplying power to the load, and otherwise, the estimated determined run-time $t_{RD}(n)$ is set at the calculated run-time $t_R(n)$.

23. The uninterruptible power system of claim 22 including means for extrapolating the maximum remaining run-time from predetermined values in a memory table of maximum available run-times for selected output power levels, and for updating the maximum available run-time values after an inverter run period where the inverter starts supplying power to the load from a fully charged battery then stops supplying power to the load, based on a last run-time displayed during the inverter run period and a duration of the inverter run period.

24. The uninterruptible power system of claim 15 wherein the control means further includes:

means for determining when power is available from an AC power system, for measuring and storing the then existing values of the power supplied to the load $P_{out}(INV)$ and the battery terminal voltage $V_B$, for discontinuing the supply of power from the battery to the load and supplying power from the AC power system to the load when power is available from the AC power system, for measuring the open circuit battery voltage $V_{B(OC)M}$ after power is no longer supplied from the battery to the load, for recharging the battery at a known rate from the AC power system, for determining the power level supplied to the load $P_{OUT}(LINE)$ from the AC power system, for determining a constant $K_3$ after power is no longer supplied from the battery to the load in accordance with the following expression:

$$K_3 = \frac{V_{B(OC)M} - V_B}{P_{OUT}(INV)} \; ;$$

for determining an estimate of the open circuit battery voltage $V_{B(OC)C}$ in accordance with the following expression:

$$V_{B(OC)C} = V_{B(OC)M} + ((K_4)*\Delta t))$$

where $K_4$ is a predetermined constant indicative of the rate of recharge of the battery and $\Delta t$ is the total time elapsed since the battery has started to be charged, for determining an estimated battery voltage under load $V_{BC}$ in accordance with the expression:

$$V_{BC} = V_{B(OC)C} - K_3 \times P_{OUT}(LINE),$$

for determining an estimated run-time $t_R(LINE)$ during supply of power to the load from the AC power system in accordance with the expression:

$$t_R(LINE) = \left[ K_1 + \frac{K_2}{P_{OUT}(LINE)} \right] * \frac{(V_{BC} - V_{LL})^2}{(V_{FC} - V_{BC})} ,$$

and for setting the estimated determined run-time $t_{RD}(n)$ to the estimated run-time $t_R(LINE)$.

25. The uninterruptible power system of claim 24 wherein if the estimated determined run-time $t_{RD}(n)$ is greater than a predetermined maximum available run-time at the power level supplied to the load $P_{OUT}(LINE)$ then the estimated determined run-time $t_{RD}(n)$ is set equal to the predetermined maximum available run-time at $P_{OUT}(LINE)$.

26. The uninterruptible power system of claim 24 wherein if the last estimated determined run-time $t_{RD}(n)$ during inverter operation is less than a selected low run-time alarm value or the power level supplied to the load $P_{out}(INV)$ is below a minimum power level then $K_3$ is not determined but is set to a previous value of $K_3$.

27. The uninterruptible power system of claim 24 wherein if $P_{OUT}(LINE)$ has changed by less than a selected amount from the power level supplied to the load while the load was supplied with power from the inverter $P_{OUT}(INV)$ and the estimated run-time $t_R(LINE)$ is less than a last estimated determined run-time while the load was supplied with power from the inverter then the estimated determined run-time $t_{RD}(n)$ is set equal to the last estimated determined run-time while the load was supplied with power from the inverter.

28. A method of determining the run-time during which power can be supplied from a battery through an inverter of an uninterruptible power supply to a load while such power is being supplied to the load, comprising the steps of:

(a) measuring the battery voltage $V_B$ while the battery supplies power to the load;

(b) calculating a base equation reference at an iteration of the run-time determination N near a start of power being supplied from the battery to the load in accordance with the expression:

$$Base(N) = \frac{(V_B(N) - V_{LL}(N))^2}{V_{FC}(N) - V_B(N)}$$

where:

Base(N) is the base equation reference at the Nth iteration of the run-time calculation, $V_B(N)$ is the measured battery voltage at the Nth iteration, $V_{LL}(N)$ is the lower limit of battery voltage below which the battery should not supply power at the Nth iteration, and $V_{FC}(N)$ is the full charge voltage of the battery;

(c) computing a scaling factor $K_S$ at an iteration n of the run-time determination in accordance with the following expression:

$$K_S = \frac{t_S * (n-N)}{\text{Base}(N) - \text{Base}(n)} = \frac{\Delta t}{\Delta \text{Base}}$$

where:

$t_S$ is a time period between iterations of the run-time determination, and

Base(n) is the base equation calculated at the nth iteration of the run-time calculation;

(d) setting a converged scaling factor $K_S'$ equal to the scaling factor $K_S$ for the nth iteration when the scaling factors for two consecutive iterations of the run-time determination converge to within a selected amount;

(e) computing a correction factor $K_C$ for an iteration n of the run-time determination in accordance with the following expression:

if $t_S * (n-N) > |K'_S * \text{Base}(N) - K'_S * \text{Base}(n)| * \left(1 + \frac{1}{n-N}\right)$ or $t_S * (n-N) < |K'_S * \text{Base}(N) - K'_S * \text{Base}(n)| * \left(1 - \frac{1}{n-N}\right)$ then $K_C = \dfrac{t_S * (n-N)}{K'_S * \text{Base}(N) - K'_S(\text{Base}(n))}$ else $K_C = 1$; and (f) setting a corrected run-time $t_R'(n)$ for the nth iteration of the run-time determination equal to the product of the converged scaling factor $K_S'$ the correction factor $K_C$ and the base equation calculated at the nth iteration of the run-time calculation Base(n).

29. The method of claim 28 further including the additional steps of determining when a fully charged battery begins to supply power to a load and determining when the battery has reached a peak voltage level and wherein the Nth iteration of the run-time determination is after the fully charged battery begins to supply power to the load and the battery has reached the peak voltage level.

30. The method of claim 28 wherein $V_{LL}$ is varied depending on a measurement of the power level supplied to the load.

31. The method of claim 28 wherein $V_{FC}$ is varied at a start of a period where a fully charged battery is supplying power to the load depending on $V_B$ and $V_{LL}$.

32. The method of claim 31 wherein $V_{FC}$ is varied after the battery has reached a peak voltage level.

33. An uninterruptible power system connectable to AC power system lines at its input terminals and to a load at its output terminals, comprising:

(a) an auxiliary power supply battery;

(b) a power supply path from the input terminals to the output terminals to normally supply power from an AC power system connected to the input terminals to a load connected to the output terminals;

(c) means, including an inverter, responsive to control signals for interrupting the supply of power through the power supply path from the AC power system lines to the load and for selectively providing AC power from the battery to the power supply path through the inverter and thence to the load;

(d) control means for providing control signals, upon occurrence of a line fault on the AC power system lines, to the means responsive to control signals to cause the supply of power to the load to be transferred from the AC power system to the battery and from the battery back to the AC power system when power is available therefrom, the control means further including means for measuring the battery voltage $V_B$ while the battery supplies power to the load, for calculating a base equation reference at an iteration of a run-time determination N near a start of power being supplied from the battery to the load in accordance with the expression:

$$\text{Base}(N) = \frac{(V_B(N) - V_{LL}(N))^2}{V_{FC}(N) - V_B(N)}$$

where:

Base(N) is the base equation reference at the Nth iteration of the run-time calculation, $V_B(N)$ is the measured battery voltage at the Nth iteration, $V_{LL}(N)$ is the lower limit of battery voltage below which the battery should not supply power at the Nth iteration, and $V_{FC}(N)$ is the full charge voltage of the battery;

for computing a scaling factor $K_S$ at an iteration n of the run-time determination in accordance with the following expression:

$$K_S = \frac{t_S * (n-N)}{\text{Base}(N) - \text{Base}(n)} = \frac{\Delta t}{\Delta \text{Base}}$$

where:

$t_S$ is a time period between iterations of the run-time determination, and

Base(n) is the base equation calculated at the nth iteration of the run-time calculation;

for setting a converged scaling factor $K_S'$ equal to the scaling factor $K_S$ for the nth iteration when the scaling factors for two consecutive iterations of the run-time determination converge to within a selected amount;

for computing a correction factor $K_C$ for an iteration n of the run-time determination in accordance with the following expression:

if $t_S * (n-N) > |K'_S * \text{Base}(N) - K'_S * \text{Base}(n)| * \left(1 + \frac{1}{n-N}\right)$ or $t_S * (n-N) < |K'_S * \text{Base}(N) - K'_S * \text{Base}(n)| * \left(1 - \frac{1}{n-N}\right)$ then $K_C = \dfrac{t_S * (n-N)}{K'_S * \text{Base}(N) - K'_S(\text{Base}(n))}$ else $K_C = 1$; and for setting a corrected run-time $t_R'(n)$ for the nth iteration of the run-time determination equal to the product of the converged scaling factor $K_S'$ the correction factor $K_C$ and the base equation calculated at the nth iteration of the run-time calculation Base(n).

34. The uninterruptible power system of claim 33 including additionally means for measuring a level of power supplied to the load and for varying $V_{LL}$ depending on the level of power supplied to the load.

35. The uninterruptible power system of claim 33 including additionally means for varying $V_{FC}$ at a start of a period where a fully charged battery is supplying power to the load depending on $V_B$ and $V_{LL}$.

36. A method for determining the maximum run-time during which power can be supplied from a battery to a load, comprising the steps of:

(a) storing one or more starting values, each starting value representing the maximum run-time from a fully charged battery supplying power to a selected percentage of a full load;

(b) extrapolating maximum run-times from the starting values;

(c) calculating a remaining run-time available while power is being supplied to the load from the battery;

(d) updating the starting values by extrapolation from the calculated remaining run-time available, wherein updating the starting values includes extrapolating a calculated run-time from an end of a period in which power was supplied to the load from a battery which was fully charged at a start of the period plus the duration of the period.

* * * * *

UNITED STATES PATENT AND TRADEMARK OFFICE
CERTIFICATE OF CORRECTION

PATENT NO. : 5,615,129
DATED : March 25, 1997
INVENTOR(S) : Stich, et al.

It is certified that error appears in the above-indentified patent and that said Letters Patent is hereby corrected as shown below:

In column 1, line 28 of the patent, delete "volatage" and insert in its place --voltage--

In column 1, line 32 of the patent, delete "interfacted" and insert in its place --interlaced--

In column 1, line 38 of the patent, delete "the" and insert in its place --a--

In column 2, line 3 of the patent, delete "batter" and insert in its place --battery--

In column 2, line 39 of the patent, delete "where" and insert in its place --where:--

In column 3, line 53 of the patent, delete "charge this" and insert in its place --

In column 4, line 5 of the patent, delete "batter" and insert in its place --battery--

In column 4, line 13 of the patent, between "eliminating" and "run-time" insert --the-

UNITED STATES PATENT AND TRADEMARK OFFICE
CERTIFICATE OF CORRECTION

Page 2 of 5

PATENT NO. : 5,615,129
DATED : March 25, 1997
INVENTOR(S) : Stich, et al.

It is certified that error appears in the above-indentified patent and that said Letters Patent is hereby corrected as shown below:

In column 5, line 23 of the patent, delete "the" and insert in its place --a--

In column 6, line 29 of the patent, delete "microprocesor" and insert in its place --microprocessor--

In column 6, line 35 of the patent, delete "for" and insert in its place --in--

In column 6, line 67 of the patent, delete "instananeous" and insert in its place --instantaneous--

In column 7, line 58 of the patent, delete "slop" and insert in its place --slope--

In column 8, line 49, delete "batter" and insert in its place --battery--

In column 8, line 50, delete "batter" and insert in its place --battery--

UNITED STATES PATENT AND TRADEMARK OFFICE
CERTIFICATE OF CORRECTION

PATENT NO. : 5,615,129
DATED : March 25, 1997
INVENTOR(S) : Stich, et al.

It is certified that error appears in the above-indentified patent and that said Letters Patent is hereby corrected as shown below:

In column 9, line 3, delete "batter" and insert in its place --battery--

In column 10, line 31, delete "fi" and insert in its place --if-- as

In column 10, line 42, between "seconds" and "out" insert --each, the allowable error will be only 10 seconds--

In column 11, line 65, after "$t_{RD}(n)=t_R(n)$" delete "," and insert --.--

In column 17, line 1, insert --Copyright © Best Power Technology, Incorporated--

In column 31, line 23, Claim 1, delete "calcuate" and insert in its place --calculated--

In column 32, line 8, Claim 7, delete "(n-1)" and insert in its place --$t_{RD}(n-1)$--

UNITED STATES PATENT AND TRADEMARK OFFICE
CERTIFICATE OF CORRECTION

PATENT NO. : 5,615,129
DATED : March 25, 1997
INVENTOR(S) : Stich, et al.

It is certified that error appears in the above-indentified patent and that said Letters Patent is hereby corrected as shown below:

In column 32, lines 34 and 35, delete "terminated" and insert in its place
--determined--

In column 33, line 17, delete "$V_{BC}=[V_{B(OC)M}]\ V_{B(OC)C}-K_3XP_{OUT}(LINE)$" and insert in its place --$V_{BC}=V_{B(OC)C}-K_3XP_{OUT}(LINE)$--

In column 35, line 13, between "$t_R(n)$" and "the" insert --if--

In column 36, line 20, delete "$V_{BC}=V_{B(OC)C}-K_3xP_{OUT}(LINE)$," and insert in its place --$V_{BC}=V_{B(OC)C}-K_3xP_{OUT}(LINE)$,--

In column 37, line 3, delete "iS" and insert in its place --is-- as

UNITED STATES PATENT AND TRADEMARK OFFICE
CERTIFICATE OF CORRECTION

PATENT NO. : 5,615,129
DATED : March 25, 1997
INVENTOR(S) : Stich, et al.

It is certified that error appears in the above-identified patent and that said Letters Patent is hereby corrected as shown below:

In column 38, line 25, delete "iS" and insert in its place --is--

Signed and Sealed this

Twenty-third Day of February, 1999

Attest:

Attesting Officer

Q. TODD DICKINSON

Acting Commissioner of Patents and Trademarks